(12) United States Patent
Leppisaari et al.

(10) Patent No.: US 7,835,345 B2
(45) Date of Patent: Nov. 16, 2010

(54) PAGE-MODE MESSAGING

(75) Inventors: Arto Leppisaari, Kangasala (FI); Jari Mutikainen, Helsinki (FI); Pekka Kuure, Espoo (FI); Adamu Haruna, Accra North (GH)

(73) Assignee: Nokia Corporation, Espoo (FI)

( * ) Notice: Subject to any disclaimer, the term of this patent is extended or adjusted under 35 U.S.C. 154(b) by 1449 days.

(21) Appl. No.: 11/206,806

(22) Filed: Aug. 19, 2005

(65) Prior Publication Data
US 2006/0274728 A1    Dec. 7, 2006

(30) Foreign Application Priority Data
Jun. 6, 2005    (FI)    .................... 20055288

(51) Int. Cl.
*H04L 12/66* (2006.01)
(52) U.S. Cl. ...................... 370/352; 370/259
(58) Field of Classification Search ................. 370/352, 370/259
See application file for complete search history.

(56) References Cited

U.S. PATENT DOCUMENTS

| 7,260,601 | B1 * | 8/2007 | Day et al. ............... 709/203 |
| 2004/0203894 | A1 * | 10/2004 | Watanabe et al. ........ 455/456.1 |
| 2005/0007971 | A1 * | 1/2005 | Jeong et al. ............. 370/312 |
| 2005/0233737 | A1 * | 10/2005 | Lin ....................... 455/416 |
| 2006/0089966 | A1 * | 4/2006 | Stille et al. ............. 709/203 |
| 2007/0218924 | A1 * | 9/2007 | Burman et al. .......... 455/466 |

FOREIGN PATENT DOCUMENTS

| CN | 1555659 A | 12/2004 |
| WO | 03009616 A1 | 1/2003 |
| WO | WO 2005/055556 A1 | 6/2005 |

OTHER PUBLICATIONS

RFC 3261 and RFC 3428.*
Kutscher et a., "Session Description and Capability Negotiation", XP015023241, Feb. 20, 2005, pp. 1-61.
International Search Report PCT/IB2007 filed Jul. 13, 2007.
B. Campbell, Ed., J. Rosenberg (dynamicsoft), H. Schulzrinne (Columbia University), C. Huitema, D. Gurle (Microsoft Corporation), "Session Initiation Protocol (SIP) Extension for Instant Messaging", Dec. 2002, pp. 1-18.
B. Campbell, et al. (dynamicsoft), P. Kyzivat (Cisco Systems), "Instant Message Sessions in SIMPLE", Jun. 30, 2003, pp. 1-56.
Simone LEGGIO (Department of Computer Science, University of Helsinki), "SIP for Instant Messaging and Presence Leveraging Extensions", (posted on the internet) Mar. 18, 2005, pp. 1-7.

(Continued)

*Primary Examiner*—Quynh H Nguyen
(74) *Attorney, Agent, or Firm*—Squire, Sanders & Dempsey, LLP (57) ABSTRACT

A way to provide page-mode messaging is to send a message using a session-mode messaging mechanism with an indication indicating that the session-mode is for a pager-type message. In response to said indication, a receiver treats the message as a page-mode message although it was received in the session-mode.

19 Claims, 6 Drawing Sheets

OTHER PUBLICATIONS

B. Campbell, et al., "The Message Session Replay Protocol," draft-ietf-simple-message-sessions-10.txt, Simple WG, Internet-Draft, Feb. 20, 2005, Expires: Aug. 24, 2005, pp. 1-53.

B. Campbell, et al., "Instant Message Sessions in SIMPLE draft-ietf-simple-message-sessions-00," SIMPLE Working Group, Internet-Draft, <tools.ietf.org.pdf/draft-ietf-simple-message-sessions-00.pdf>, May 22, 2003, Expires: Nov. 20, 2003, pp. 1-47.

Russian Office Action, Russian Patent Application No. 2007144490/09(048746), Date: Sep. 4, 2009, pp. 1-6, English Translation: pp. 1-5.

Notification of the First Office Action, Chinese Application No. 200680025858.7, Date of Notification: May 11, 2010, pp. 1-6.

Canadian Office Action, Canadian Patent Application No. 2,609,958; Date: Jul. 12, 2010, pp. 1-3.

* cited by examiner

```
INVITE sip:bob@otherexample.com SIP/2.0
To: <sip:bob@otherexample.com>
From: <sip:alice@example.com>;tag=786
Call-ID: 3413an89KU
Content-Type: application/sdp v=0
o=alice 2890844526 2890844527 IN IP4 alice.example.com
s=-
c=IN IP4 10.1.1.1
m=message 9 msrp page-mode
a=accept-types:message/cpim text/plain
a=path:msrp://atlanta.example.com:7654/jshA7we;tcp
a=max-size: actual size
```

```
INVITE sip:bob@otherexample.com SIP/2.0
To: <sip:bob@otherexample.com>
From: <sip:alice@example.com>;tag=786
Call-ID: 3413an89KU
Content-Type: application/sdp v=0
o=alice 2890844526 2890844527 IN IP4 alice.example.com
s=-
c=IN IP4 10.1.1.1
m=message 9 msrp page-mode
a=accept-types:message/cpim text/plain
a=path:msrp://atlanta.example.com:7654/jshA7we;tcp
a=max-size: max size
a=actual-size: actual size
```

```
INVITE sip:bob@otherexample.com SIP/2.0
To: <sip:bob@otherexample.com>
From: <sip:alice@example.com>;tag=786
Call-ID: 3413an89KU
Content-Type: application/sdp v=0
o=alice 2890844526 2890844527 IN IP4 alice.example.com
s=-
c=IN IP4 10.1.1.1
m=message 9 msrp
a=accept-types:message/cpim text/plain
a=path:msrp://atlanta.example.com:7654/jshA7we;tcp
a=max-size: max size
a=actual-size: actual size
```

```
INVITE sip:bob@otherexample.com SIP/2.0
To: <sip:bob@otherexample.com>
From: <sip:alice@example.com>;tag=786
Call-ID: 3413an89KU
Content-Type: application/sdp v=0
o=alice 2890844526 2890844527 IN IP4 alice.example.com
s=-
c=IN IP4 10.1.1.1
m=message 9 msrp page-mode
a=accept-types:message/cpim text/plain
a=path:msrp://atlanta.example.com:7654/jshA7we;tcp
a=max-size: max size
```

PAGE-MODE MESSAGING

FIELD OF THE INVENTION

The invention relates to messaging, and more particularly to page-mode messaging, also called one-shot messaging.

BACKGROUND OF THE INVENTION

The evolvement of communication technology, particularly IP-based communication technology and end user terminals, has enabled versatile communication possibilities and introduction of different services. More and more often services are implemented using primitives provided by SIP (Session Initiation Protocol) which is not vertically integrated into a communications system but a tool to build a multimedia architecture. More precisely, SIP is an IETF defined application-layer control (signaling) protocol for creating, modifying, and terminating sessions with one or more participants. These sessions include Internet telephone calls, multimedia distribution, multimedia conferences, and PoC (Push to talk over Cellular) sessions, for example. For messaging services, SIMPLE (SIP for Instant Messaging and Presence Leveraging Extensions) using SIP and existing implementations of SIP to provide presence and instant messaging service is being defined in IETF. OMA (Open Mobile Alliance) also defines IM (Instant Messaging) enabler based on SIP/SIMPLE protocols. SIMPLE defines two modes of instant message exchange: page-mode and session-mode. The page-mode uses SIP MESSAGE method by which a page-mode instant message is sent and where, at a protocol level, a subsequent instant message is not related to the preceding one: each immediate message, even a reply to a previous message, is considered as an independent transaction. Thus, the SIP MESSAGE method resembles a conventional email or short message service. The session-mode uses SIP for signaling and session establishment and MSRP (Message Session Relay Protocol) for carrying a series of instant messages after a session has been established. Below, the combination is simply called an MSRP mechanism. In other words, an MSRP mechanism provides chat-type messaging, called session-mode messaging.

A problem arises when a user wants to send a large page-mode message. The SIP MESSAGE method may use either UDP or TCP transport. TCP provides a reliable transport method also for large messages, but TCP transport cannot always be guaranteed for the SIP MESSAGE method. If UDP is used for sending a large message, packets larger than UDP maximum size are fragmented and may not arrive in the right order at the recipient. In addition, even if TCP could be guaranteed, another problem relating to congestion control remains. Since the SIP MESSAGE method is part of SIP session control signaling, a message is sent and received using the very same resource as used by the SIP signaling. For a user terminal this means that the actual SIP signaling may be blocked for the time the large message is being sent or received in the user terminal. The above-mentioned resource for the SIP signaling may be a general-purpose PDP (Packet Data Protocol) context or a dedicated signaling PDP context in case of the GERAN (GSM/EDGE Radio Access Network) and/or UTRAN (UMTS Terrestrial Radio Access Network) systems, for example. In other systems, the resource may be a reserved and/or dedicated bandwidth for signaling purposes, for example. In addition to the SIP signaling being blocked, a further problem relating to loading of SIP proxies may arise. As a page-mode message conventionally uses the SIP MESSAGE method, all messages using the SIP MESSAGE method are transmitted through the SIP proxies. Thus, the large size page-mode messages transmitted through the SIP proxies may cause a severe decrease in the performance of the SIP proxies, resulting in both effectively blocking all SIP signaling and decreasing the overall performance of the SIP network. Therefore, in some cases, the SIP MESSAGE method is not feasible to be used for a large size message.

One solution is that when the message size exceeds a certain limit, instead of the SIP MESSAGE method the MSRP mechanism is used. However, the MSRP mechanism is for a session-mode messaging service, not for page-mode messaging. Additionally, received page-mode messages can be deferred and are stored into a messaging inbox, wherefrom the user can read them when it is convenient, but in the session-mode messaging a received message is opened by the user terminal and shown to the user to facilitate a dialog. Thus, from the receiver's point of view, no page-mode messages can be received when the MSRP mechanism is used.

BRIEF DESCRIPTION OF THE INVENTION

An object of the present invention is to provide a method and an apparatus for implementing the method so as to overcome the above problem. The objects of the invention are achieved by a method, user terminals and a server which are characterized by what is stated in the independent claims. Preferred embodiments of the invention are disclosed in the dependent claims.

The invention is based on realizing the problem and solving it by indicating whether or not a message sent using a session-mode (chat-type) messaging mechanism is a page-mode message, and in response to the message being a page-mode message, acting as if it had been received using a page-mode mechanism or according to specific instructions defined for such a page-mode message. By session-mode is meant that a protocol, such as MSRP, intended for exchanging series of messages is used. By page-mode is meant that each message is an independent transaction at a protocol level, i.e. a subsequent instant message is not related, at the protocol level, to the preceding one.

An advantage of the invention is that by using the indication, page-mode messages can be received as page-mode messages, even when transmitted as session-mode messages. Another advantage is that blocking of SIP signaling due to large messages can be avoided.

BRIEF DESCRIPTION OF THE DRAWINGS

In the following, the invention will be described in greater detail by means of the preferred embodiments with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminals, servers and/or to any communications system or any combination of different communications systems that is/are accessible by user terminals and provide(s) messaging services, i.e. sending data in a message format from one entity to another either in near real time or into a mailbox. No limitations exist to the message format, neither to the data type. The data may be text, voice, video clips, multimedia, etc. The communications system may be a fixed communications system or a wireless communications system or a communications system utilizing both fixed networks and wireless networks. The protocols used, the specifications of communications systems and terminals, especially in wireless communications, develop rapidly. Such development may require extra changes to the invention. Therefore, all words and expressions should be interpreted broadly and they are intended to illustrate, not to restrict, the invention.

In the following, the present invention will be described using, as an example of a system environment whereto the present invention may be applied, a very simplified system environment utilizing SIP and MSRP, without restricting the invention thereto. It should be appreciated that the communications system and the intermediate nodes, such as proxies, and other protocols used below or above SIP and MSRP, or corresponding protocols, are irrelevant to the actual invention. Therefore, they need not to be discussed in more detail here. The present invention primarily relates to a message transmission in an application layer.

Figure 1:
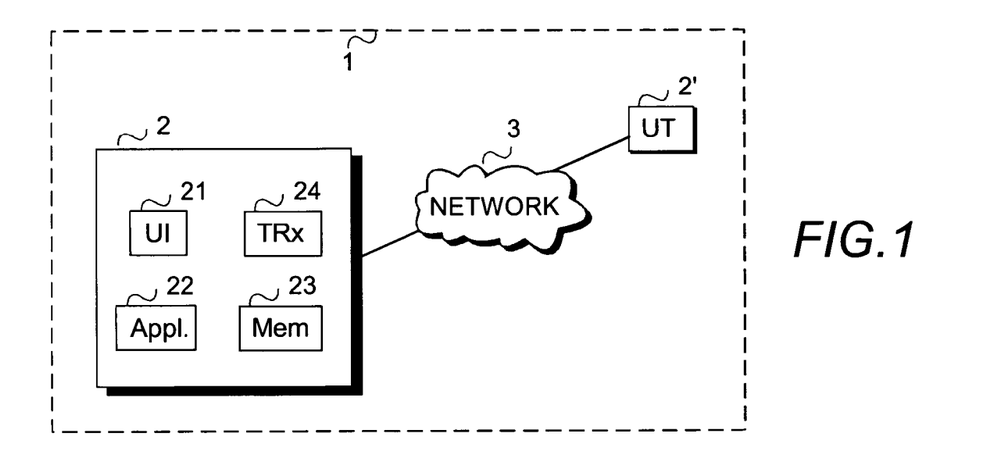
FIG. 1 shows a simplified system architecture.

FIG. 1 is a highly simplified system architecture only showing a communications system 1, two user terminals UT 2, 2' and a network 3. It is apparent to a person skilled in the art that the system(s) also comprise(s) other devices, system entities, such as instant messaging servers, functions and structures, that need not be described in detail herein.

A user terminal 2, 2' is a piece of equipment or a device that allows a user to interact with a communications system directly or via a computer system, that is, it presents information to the user and allows the user to input information, i.e. the user terminal is a termination point of particular communication. In other words, the user terminal 2, 2' may be any node or a host which supports messaging and is able to communicate with a network of the system, over an access network (not shown in FIG. 1) if such an access network exists. The user terminal 2, 2' may be a non-mobile apparatus, such as a personal computer PC, connected to the network 3 wirelessly or via a fixed connection. The user terminal 2, 2' may also be a wireless mobile terminal supporting messaging, a multi-service terminal that serves as a service platform and supports loading and execution of different service-related functions, or a laptop PC, connectable to the network (via a possible access network), a personal digital assistant PDA, connectable to the network (via the possible access network), etc.

The user terminal 2 comprises at least one user interface (UI) 21 via which the user can create and/or read messages, one or more messaging applications (Appl.) 22, memory (Mem) 23 (or the user terminal is arranged to have access to memory) for storing received page-mode type messages at least temporarily, and a transceiver (TRx) 24 for sending and receiving communications (messages).

The messaging application 22 may be a software application configured to implement a functionality according to the invention. The functionality may be achieved by updating a corresponding messaging application or by adding a new messaging application to the terminal, for example.

Figure 2:
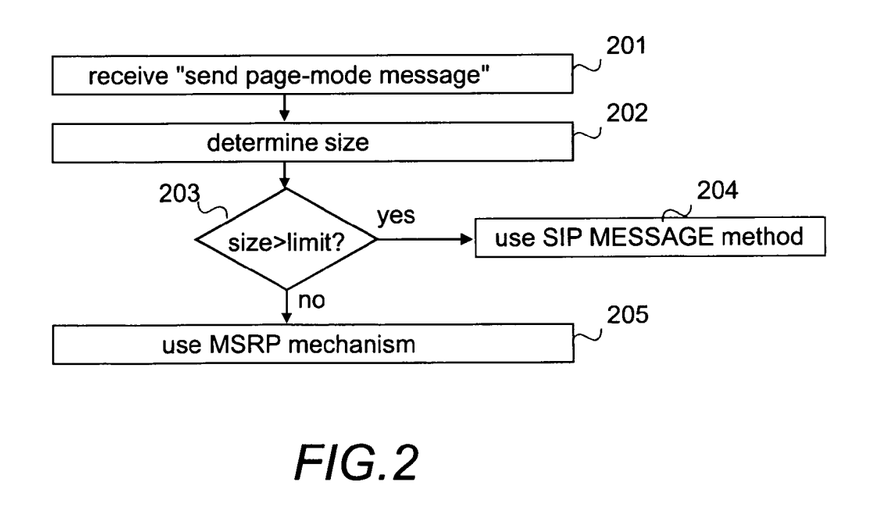
FIG. 2 is a flow chart illustrating a functionality of a user terminal according to an embodiment of the invention in a sending mode.

FIG. 2 is a flow chart illustrating a functionality of a user terminal according to an embodiment of the invention in a sending mode. In the example of FIG. 2 it is assumed that the user always creates page-mode messages in a similar way and that the user terminal selects the method/mechanism to be used with the message.

FIG. 2 starts when the user has created a page-mode message and gives, via a user interface, instructions to send the message to a receiver (step 201). In other words, the user terminal receives, in step 201, a "send message to this address" command. In response to the command, the user terminal determines, in step 202, the size of the message and checks, in step 203, whether or not the message size is larger than a predetermined limit for the size. The predetermined limit may be defined by a service protocol used, by the user or by the operator or it may be preconfigured to the terminal, for example. Preferably, the predetermined limit corresponds to a size which fits into a transport protocol message. However, the value of the predetermined limit and the way in which the predetermined limit is set bears no significance for the present invention. In some embodiments of the invention, it is even possible that all page-mode messages, regardless of their size, are sent using the MSRP mechanism or a corresponding mechanism. For example, the user terminal may be pre-configured to always use session-mode because the operator does not allow page-mode to be used.

If the message size does not exceed than the limit (step 203), the user terminal sends, in step 204, the contents using the SIP MESSAGE method.

If the message size does exceed the limit (step 203), the user terminal sends, in step 205, the message using the MSRP mechanism, according to the invention, with a page mode indicator. Depending on the implementation, the user terminal may or may not add information to the page-mode message sent by MSRP on the actual size of the message. The actual message sending procedure is illustrated in more detail in FIGS. 6, 7 and 8.

In one embodiment of the invention, the user has to select from among three options: small page-mode message (size is smaller than or equal to a predetermined limit), other page-mode messages, session (chat) messaging, and when the user selects other page-mode messages, the session-mode messaging mechanism with a page-mode indicator is used when the message is sent.

Figure 3:
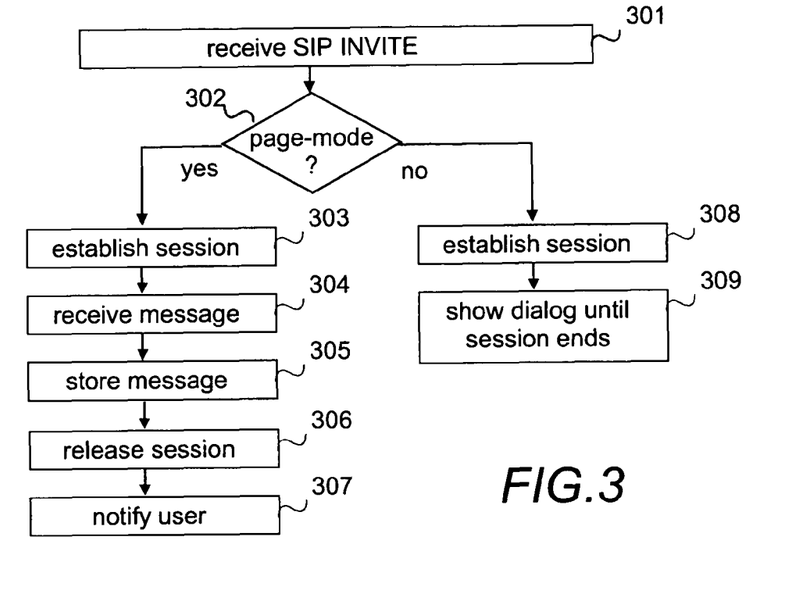
FIGS. 3 and 4 are flow charts illustrating a functionality of a user terminal according to embodiments of the invention in a receiving mode.

FIG. 3 is a flow chart illustrating a functionality of a user terminal according to an embodiment of the invention in a receiving mode. In the example of FIG. 3, it is assumed that no information on the actual size of the message is transmitted. Further assumptions made for the sake of clarity are, that the user terminal has enough free memory for messages so that the message may be received, and that the user terminal is configured to accept page-mode messages. What happens if the message is larger than the free memory is irrelevant for the invention; this depends on the receiving terminal's implementation; a terminal may reject the session request if not enough free memory exists, or a session request is accepted but the session is terminated when the memory is full, for example.

In response to receiving a SIP INVITE (MSRP) (step 301), the user terminal checks, in step 302, whether or not the SIP INVITE (MSRP) is for a page-mode message. If yes, the user terminal establishes, in step 303, a session; receives, in step 304, the message; and stores, in step 305, the message; and releases, in step 306, the session. Subsequently, or simultaneously, the user terminal indicates, in step 307, to the user that a message has been received. The user may then read the message later. In other words, the user terminal acts towards the user as if the message were received over a SIP MESSAGE method.

If the SIP INVITE (MSRP) is for chat (i.e. for session-mode messaging), not for a page-mode message (step 302), the user terminal establishes, in step 308, a session and shows, in step 309, the dialog until the session ends.

The receiving user terminal may be configured to reject all page-mode messages, in which case no session is established but, instead of steps 303 to 307, a rejection is sent.

Figure 7:
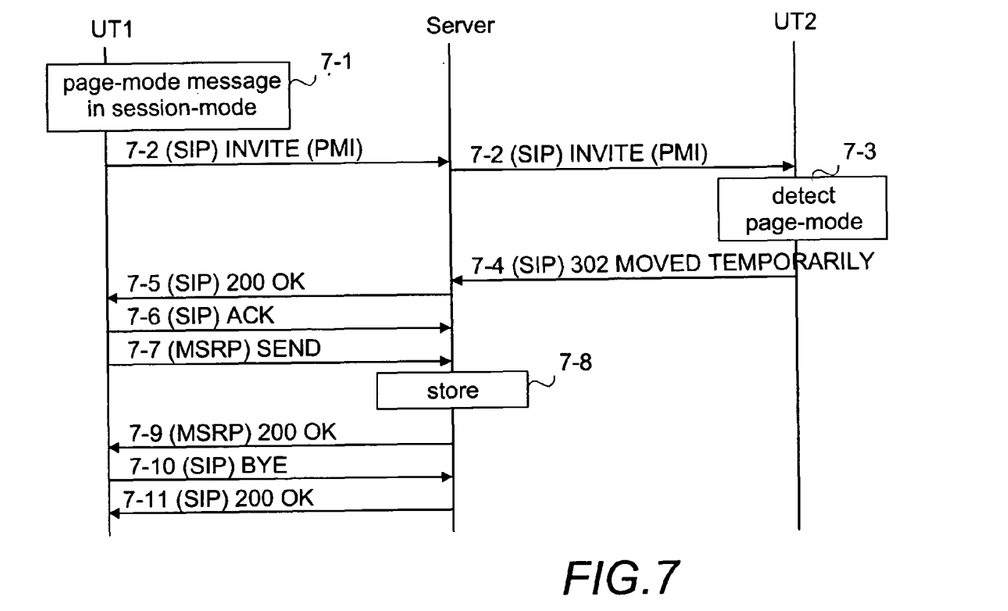
Figure 8:
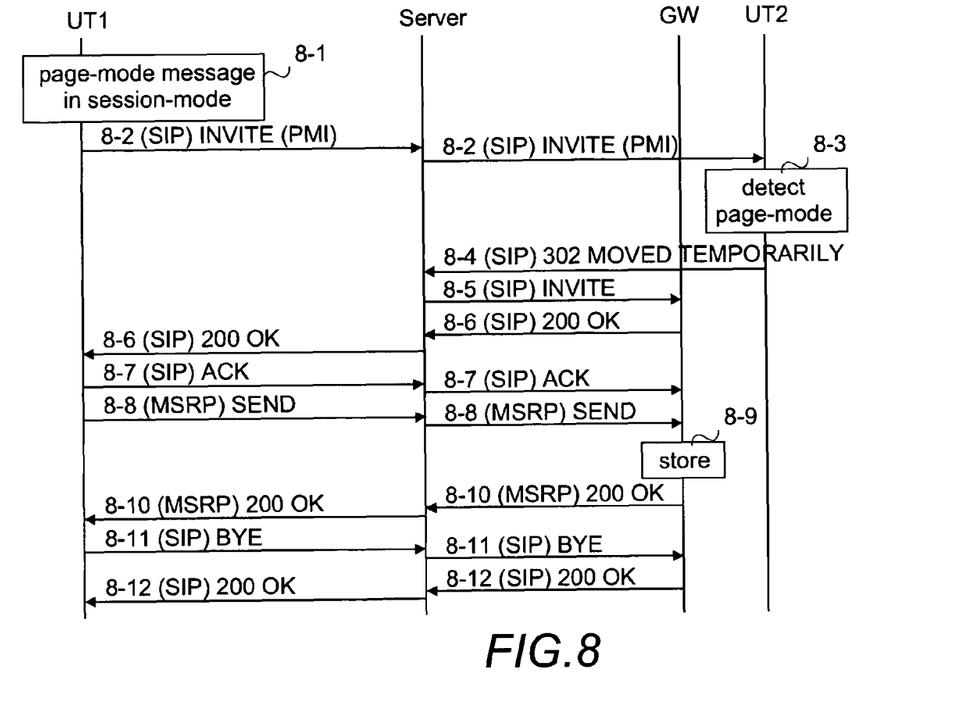

The receiving user terminal may be configured to forward page-mode message requests to a network inbox, to another terminal, etc., in which case no session is established but, instead of steps 303 to 307, the request is forwarded. Examples of such situations are illustrated in FIGS. 7 and 8. Even if all page-mode messages are forwarded to be stored elsewhere, and the user needs to view them by another terminal, the forwarding terminal is considered to provide the page-mode messaging.

In another embodiment of the invention, the checking is performed after the message is received (i.e. step 302 is performed after step 304, and the process continues after the checking either in step 305 or in step 308).

Figure 4:
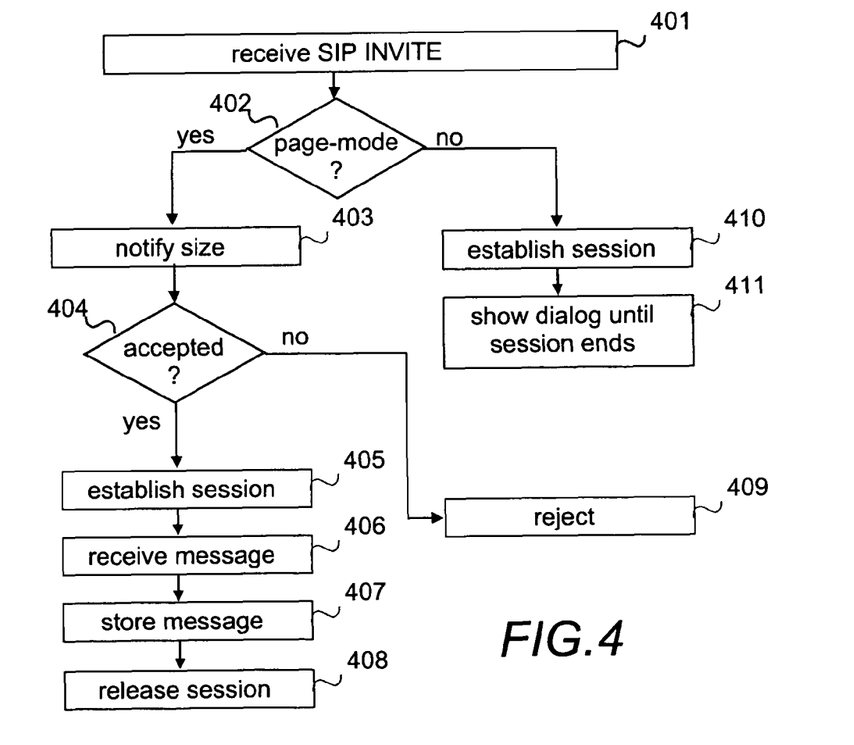

FIG. 4 is a flow chart illustrating a functionality of a user terminal according to another embodiment of the invention in a receiving mode. In the example of FIG. 4, it is assumed that information exists on the actual size of the message. Further assumptions made for the sake of clarity are, as above in connection with FIG. 3, with the same explanations not unnecessarily repeated here, that the user terminal has enough free memory for messages and that the user terminal is configured to accept page-mode messages.

In response to receiving SIP INVITE (MSRP) (step 401), the user terminal checks, in step 402, whether or not the SIP INVITE (MSRP) is for a page-mode message. If yes, the user terminal notifies, in step 403, the user about the size of the message. If the user accepts the message (step 404), the user terminal establishes, in step 405, a session; receives, in step 406, the message; and stores, in step 407, the message. The user may then read the message later. Next the user terminal releases, in step 408, the session. In other words, the user terminal acts towards the user as if the message were received over a SIP MESSAGE method. In this specific example, the user terminal does not notify the user about the reception of the message because it is assumed that by accepting the message delivery the user was already notified about the message. However, in another implementation, the user device may be configured to also notify the reception of the message to the user.

If the user does not accept the message (step 404), the user terminal rejects, in step 409, session establishment. In another embodiment, the user terminal, instead of rejecting, may forward session establishment so that the message is stored in the network and can be retrieved later, as illustrated in FIGS. 7 and 8.

If the SIP INVITE (MSRP) is for chat (i.e. for session-mode messaging), not for a page-mode message (step 402), the user terminal establishes, in step 410, a session and shows, in step 411, the dialog until the session ends.

In another embodiment of the invention, instead of asking whether or not the user accepts the message, (i.e. instead of step 403), the user terminal is configured to accept a message which does not exceed a predefined size limit. The predefined size limit may be defined by an operator, by a user terminal manufacturer and/or by a user, for example.

In the following, the signaling will be described in more detail with some examples illustrated in FIGS. 5A to 8, using SDP (Session Description Protocol) to initiate a session and MSRP over TCP to transmit the actual contents without limiting the invention to such examples. Another assumption made in connection with the following examples is that the receiving user terminal will not reject the message. If required, further information can be found at http://www.ietf.org/internet-drafts/draft-ieff-simple-message-sessions10.txt, which is incorporated herein as a reference. However, it bears no significance for the invention which protocols are used, the above ones only being examples. For example, instead of SDP, other offer-answer mechanism protocols may be used and, instead of TCP, other congestion-controlled protocols, such as SCTP (Signaling Common Transport Protocol), may be used.

FIGS. 5A to 5D illustrate some examples of how a session-mode message may indicate that a session-mode invitation is for a page-mode message.

Figure 5A:
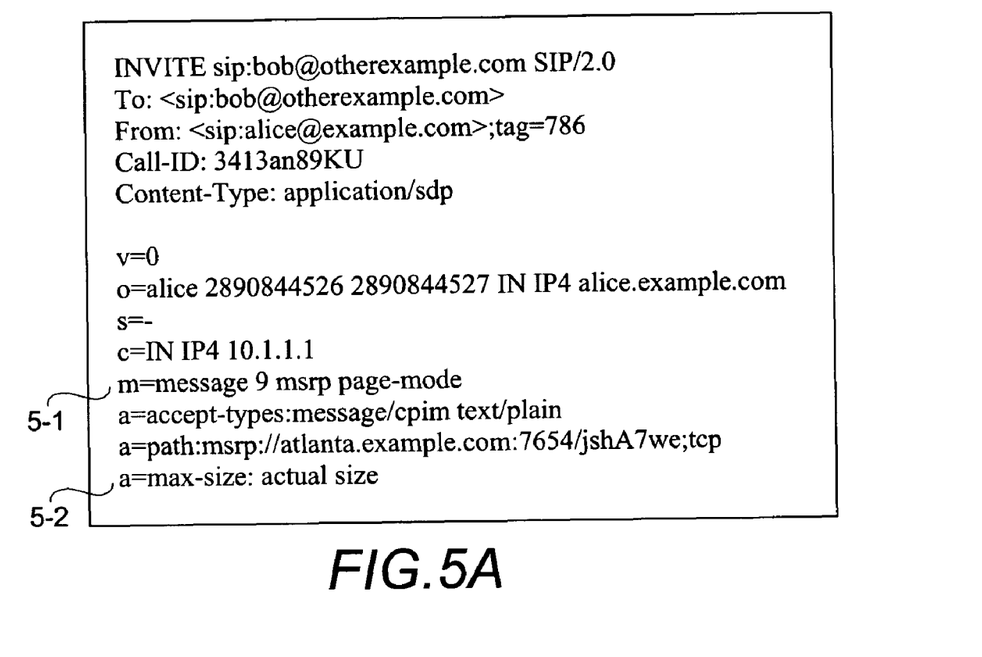
FIGS. 5A to 5D illustrate examples of SIP INVITE messages according to embodiments of the invention.

In the embodiment of FIG. 5A, a page-mode message is indicated by a combination of an m-line containing a new page mode indicator 5-1 (m=message 9 msrp page-mode) and a parameter a=max-size indicating the actual size of the message 5-2 (a=max-size: actual size).

Figure 5B:
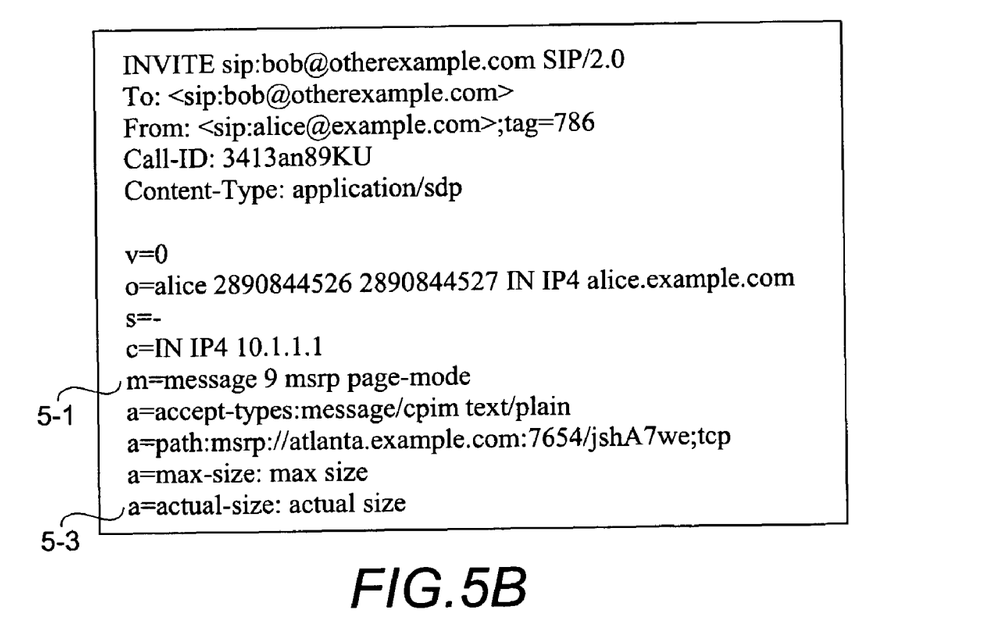

In the embodiment of FIG. 5B, a page-mode message is indicated by a combination of the m-line containing the new page mode indicator 5-1 (m=message 9 msrp page-mode) and a parameter 5-3 a=actual-size indicating the actual size of the message (a=actual-size: actual size). In this embodiment, the parameter a=max-size indicates the maximum size of a message.

Figure 5C:
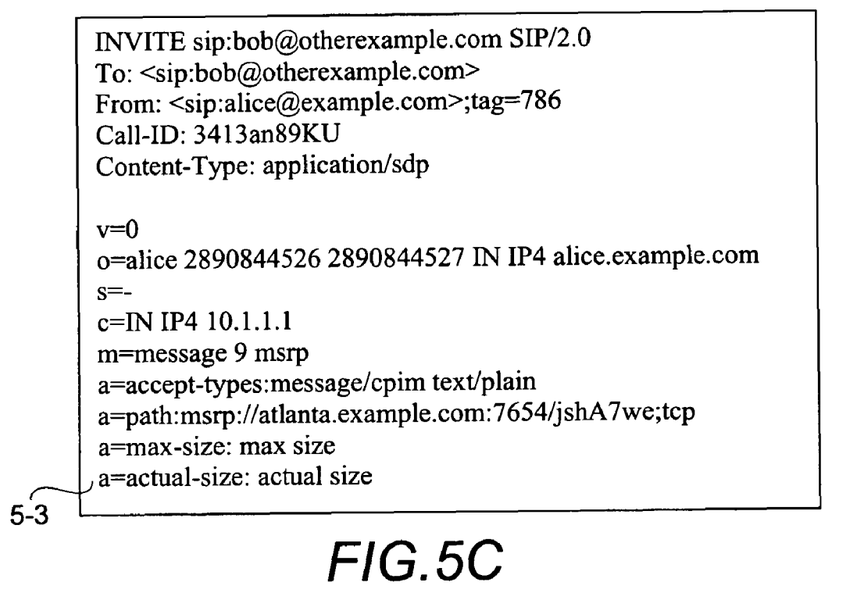

In the embodiment of FIG. 5C, a page-mode message is indicated by the parameter 5-3 a=actual-size. When the value of the parameter differs from 0, it implicitly indicates that the message is a page-mode message, or vice versa. In this embodiment, the m-line information indicates that MSRP is to be used and the parameter a=max-size indicates the maximum size of a message.

Figure 5D:
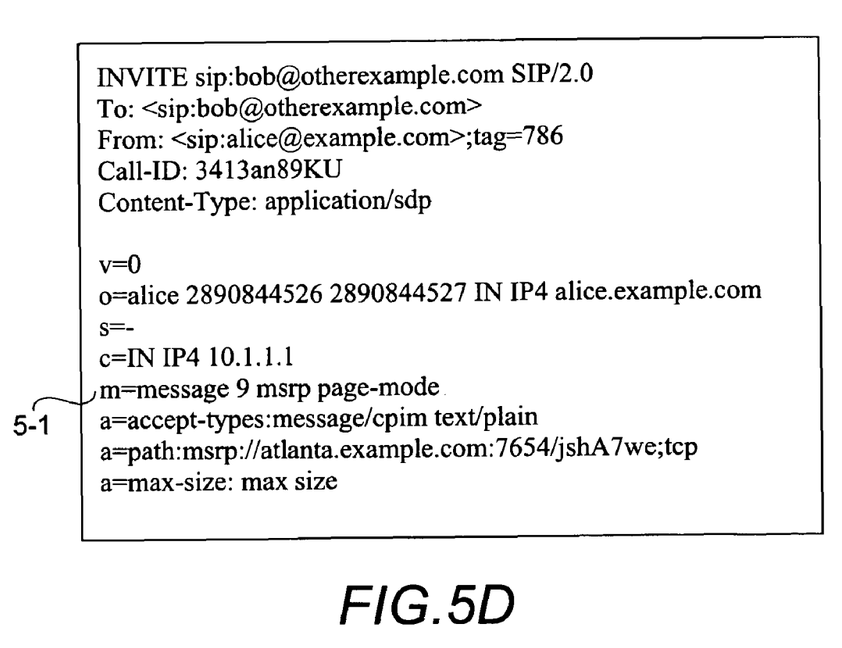

In the embodiment of FIG. 5D, a page-mode message is indicated by the m-line containing a new page mode indicator 5-1 (m=message 9 msrp page-mode). In this embodiment, the parameter a=max-size indicates the maximum size of a message and no additional a-parameter is required.

Figure 6:
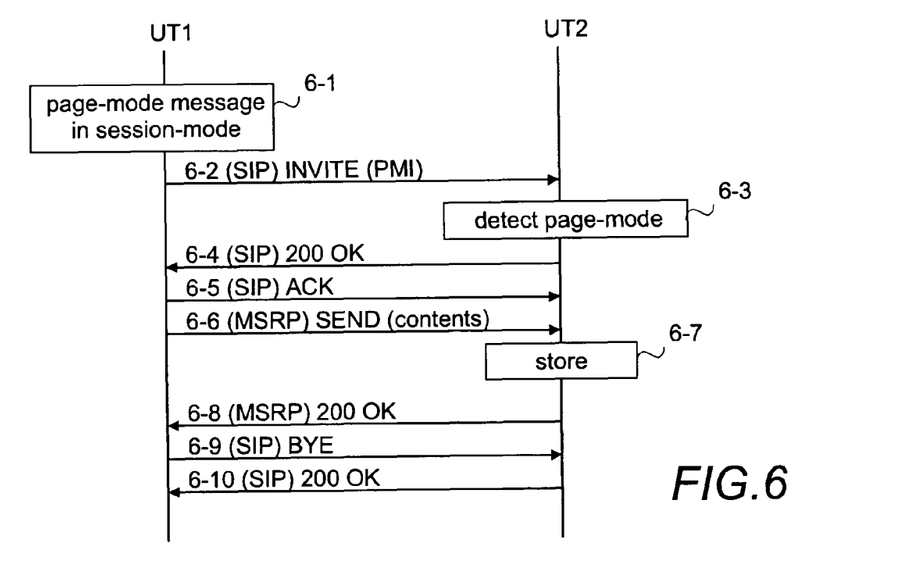
FIGS. 6, 7, 8 and 9 illustrate signaling according to embodiments of the invention.

In the signaling chart of FIG. 6, only signaling between endpoints is shown although one or more intermediaries may be involved. FIG. 6 illustrates signaling when a receiver, or more precisely, a corresponding client in the receiver's user terminal, accepts the message. FIG. 6 starts when Alice wants to send a message to Bob. Alice's user terminal UT1 (more precisely, a corresponding client in UT1) notices, in point 6-1, that the page-mode message has to be sent using a session-mode mechanism. (Point 6-1 is described in detail above in FIG. 2). Therefore, UT1 sends a session invitation message 6-2 with a page-mode indication PMI to Bob's user terminal UT2. Message 6-2 is preferably one of the messages illustrated in FIGS. 5A to 5D. In response to receiving message 6-2, UT2 detects, in point 6-3, that the message is a session-mode invitation for a page-mode message, and accepts the invitation by sending message 6-4. UT1 acknowledges the acceptance by sending message 6-5, and UT1 then sends the actual contents of the page-mode message in a session-mode message 6-6. In response to receiving the contents, UT2 stores, in point 6-7, the contents so that Bob can view them later. UT2 may also notify Bob, as described above in FIGS. 3 and 4. In response to receiving the contents, UT2 also acknowledges the reception by sending a session-mode acknowledgement in message 6-8. In the embodiment illustrated in FIG. 6, the sending user terminal, UT1, is configured to terminate the session in response to the acknowledgement by sending message 6-9 to UT2, which then sends message 6-10 to acknowledge the termination.

In the signaling chart of FIG. 7, signaling between endpoints via a participating instant messaging server of the receiving endpoint is shown although one or more intermediaries may be involved. FIG. 7 illustrates signaling when a receiver, or more precisely, a corresponding client in the receiver's user terminal, does not accept the message but requests the network to save the message for later retrieval. FIG. 7 starts when Alice wants to send a message to Bob. Alice's user terminal UT1 (more precisely, a corresponding client in UT1) notices, in point 7-1, that the page-mode message has to be sent using a session-mode mechanism. (Point 7-1 is described in detail above in connection with FIG. 2). Therefore, UT1 sends a session invitation message 7-2 with a page-mode indication PMI to Bob's user terminal UT2 via the server. Message 7-2 is preferably one of the messages illustrated in FIGS. 5A to 5D. In response to receiving message 7-2, UT2 detects, in point 7-3, that the message is a session-mode invitation for a page-mode message. For some reason, UT2 does not accept the page mode message but sends a redirecting message 7-4 to the server. One example of redirecting messages is a SIP 302 "Moved Temporarily" message which may contain information on how a message should be treated. However, it is irrelevant to the invention how and with which protocols redirection is performed and additional instructions/information is/are given, if necessary. Other examples include utilizing separate transactions using SIP protocols, such as SIP PUBLISH, SIP OPTIONS, called capabilities in SIP REGISTER, or with XCAP (extensible markup language Configuration Access Protocol). UT2 may also notify Bob about the message, as described above in connection with FIGS. 3 and 4.

In this example, the server, and more precisely, a back-toback-user-agent, accepts to offer an alternative service, and therefore the server assumes itself to be the session end-point and accepts the initial invitation by sending message 7-5. UT1 acknowledges the acceptance by sending message 7-6 to the server and then sends the actual contents of the page-mode message in a session-mode message 7-7 to the server. In response to receiving the contents, the server stores, in point 7-8, the contents so that Bob can view them later. In response to receiving the contents, the server also acknowledges the reception by sending a session-mode acknowledgement in message 7-9. In the embodiment illustrated in FIG. 7, the sending user terminal, UT1, is configured to terminate the session in response to the acknowledgement by sending message 7-10 to the server, which then sends message 7-11 to acknowledge the termination. Bob may then view the message contents later, but the implementation of this viewing is irrelevant for the invention, and is therefore not discussed here in detail.

In the signaling chart of FIG. 8, as in FIG. 7, signaling between endpoints via a participating instant messaging server of the receiving endpoint is shown although one or more intermediaries may be involved. FIG. 8 illustrates signaling when a receiver, or more precisely, a corresponding client in the receiver's user terminal, does not accept the message but requests a gateway GW in the network to save the message for later retrieval. FIG. 8 starts when Alice wants to send a message to Bob. Alice's user terminal UT1 (more precisely, a corresponding client in UT1) notices, in point 8-1, that the page-mode message has to be sent using a session-mode mechanism. (Point 8-1 is described in detail above in connection with FIG. 2). Therefore UT1 sends a session invitation message 8-2 with a page-mode indication PMI to Bob's user terminal UT2 via the server. Message 8-2 is preferably one of the messages illustrated in FIGS. 5A to 5D. In response to receiving message 8-2, UT2 detects, in point 8-3, that the message is a session-mode invitation for a page-mode message. For some reason, UT2 does not accept the page mode message but sends a redirecting message 84 to the server, the redirecting message indicating that the message should be forwarded to the gateway GW. (Redirecting messages were discussed above in connection with FIG. 7.) UT2 may also notify Bob about the message, as described above in connection with FIGS. 3 and 4.

In this example, the server, and more precisely, a back-toback-user-agent, generates a new request to the URI (uniform resource identifier) of GW indicated in message 84 and sends the request in message 8-5. The request is preferably a session-mode invitation without a page-mode indication. GW accepts the initial invitation by sending message 8-6. UT1 acknowledges the acceptance by sending message 8-7 to GW and then sends the actual contents of the page-mode message in a session-mode message 88 to the GW. In response to receiving the contents, GW stores, in point 8-9, the contents so that Bob can view them later. In response to receiving the contents, GW also acknowledges the reception by sending a session-mode acknowledgement in message 8-10. In the embodiment illustrated in connection with FIG. 8, the sending user terminal, UT1, is configured to terminate the session in response to the acknowledgement by sending message 8-11 to GW, which then sends message 8-12 to acknowledge the termination. Bob may then view the message contents later, but the implementation of this viewing is irrelevant to the invention, and is therefore not discussed here in detail.

Figure 9:
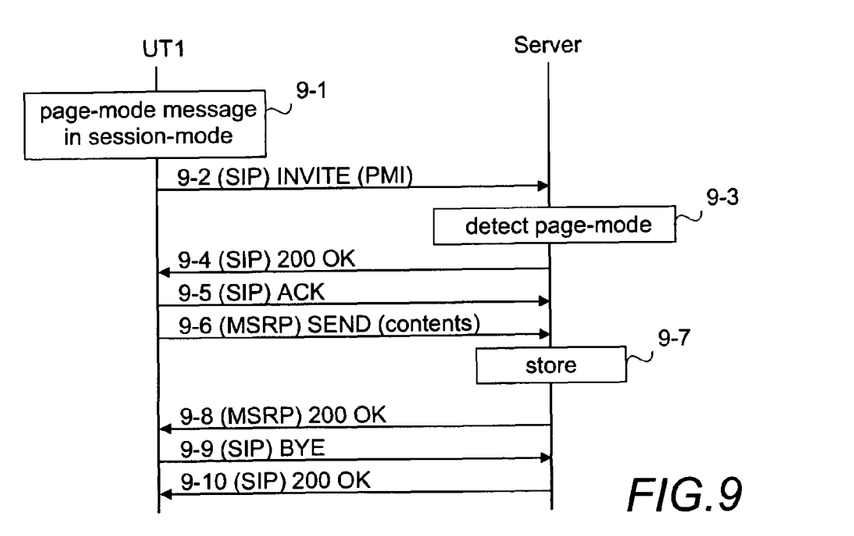

FIG. 9 illustrates signaling according to a further embodiment of the invention, in which embodiment an instant messaging server is also configured to detect the indication. The instant messaging server may be a separate server or a server component in a network node comprising one or more other components. In the example illustrated in FIG. 9, it is assumed that the recipient (UT2) is not reachable or has a configuration according to which recipient's page-mode messages are to be stored in the recipient's network inbox, in this example being located in the server. This may also be a network configuration. In the signaling chart of FIG. 9, signaling between a sending endpoint UT1 and a participating instant messaging server of the receiving endpoint is shown although one or more intermediaries may be involved. FIG. 9 starts when Alice wants to send a message to Bob. Alice's user terminal UT1 (more precisely, a corresponding client in UT1) notices, in point 9-1, that the page-mode message has to be sent using a session-mode mechanism. (Point 9-1 is described in detail above in connection with FIG. 2). Therefore, UT1 sends a session invitation message 9-2 with a page-mode indication PMI to Bob's user terminal UT2 via the server. Message 9-2 is preferably one of the messages illustrated in FIGS. 5A to 5D. In response to receiving message 9-2, the server, and more precisely, a back-to-back-user-agent, detects, in point 9-3, that the message is a session-mode invitation for a page-mode message, and therefore checks Bob's, i.e. UT2's, configurations for page-mode messages. Since the configurations show that page-mode messages are to be stored for later retrieval, the server assumes itself to be the session end-point and accepts the invitation by sending message 94. UT1 acknowledges the acceptance by sending message 9-5 to the server and then sends the actual contents of the page-mode message in a session-mode message 9-6 to the server. In response to receiving the contents, the server stores, in point 9-7, the contents so that Bob can view them later. In some other embodiment of the invention, the message may be stored in another network node or a remote database or forwarded to a gateway. In response to receiving the contents, the server also acknowledges the reception by sending a session-mode acknowledgement in message 9-8. In the embodiment illustrated in connection with FIG. 9, the sending user terminal, UT1, is configured to terminate the session in response to the acknowledgement by sending message 9-9 to the server, which then sends message 9-10 to acknowledge the termination. Bob may then view the message contents later, but the implementation of this viewing is irrelevant for the invention and is therefore not discussed here in detail.

In another embodiment of the invention, the receiver's instant messaging server is arranged to decide whether or not to forward the session request or to assume itself to be an ending point on the basis of the message size, receiver's terminal capabilities and/or network load.

In a further embodiment based on FIG. 9, the user may have a configuration according to which page-mode messages transmitted using a session-mode mechanism are stored in the network inbox and only notified to the user, whereas page-mode messages transmitted using a page-mode mechanism are forwarded to the user.

The steps, points and signaling messages shown in FIGS. 2, 3, 4, 6, 7, 8 and 9 are in no absolute chronological order and some of the steps/points may be performed simultaneously or in an order different from the given one. Other functions can also be executed between the steps/points or within the steps/points. Some of the steps/points or part of the steps/points can also be left out. The signaling messages are only exemplary and may even comprise several separate messages for transmitting the same information. In addition, the messages may also contain other information. The messages and steps/points can also be freely combined or divided into several parts. Furthermore, the names, types and/or contents of the messages may differ from the above-mentioned ones, as well as the protocols used.

Although in the above the invention has been disclosed assuming that the communication, i.e. file transmission and calls, is one-to-one communication, it is obvious to one skilled in the art that the communication may as well be one-to-many communication.

The embodiments presented above or parts thereof can be combined to produce preferred embodiments of the invention.

The user terminals, other corresponding devices and/or servers or corresponding server components implementing the functionality of the present invention comprise not only prior art means but also means for sending and/or receiving page-mode messages in the manner described above. Present network nodes and user terminals comprise processors and memory that can be utilized in the functions according to the invention. All modifications and configurations required for implementing the invention may be performed as routines, which may be implemented as added or updated software routines, application circuits (ASIC) and/or programmable circuits.

It will be obvious to a person skilled in the art that as technology advances, the inventive concept can be implemented in various ways. The invention and its embodiments are not limited to the examples described above but may vary within the scope of the claims.

The invention claimed is:

1. A method, comprising:
   sending, using a terminal, a page-mode message using a session-mode messaging mechanism, with an indication indicating that a session-mode is for the page-mode message, in response to a page-mode message size exceeding a predetermined limit;
   applying, using the terminal, a session description protocol to initiate a session in the session-mode messaging mechanism; and
   adding, using the terminal, the indication to a header of a session initiation message.

2. A method of claim 1, further comprising:
   creating, using the terminal, a session for sending the page-mode message; and
   terminating, using the terminal, the session in response to the page-mode message having been sent.

3. A method of claim 1, further comprising:
   creating, using the terminal, a session for sending the page-mode message;
   receiving, using the terminal, information that the page-mode message have been received; and
   terminating, using the terminal, the session in response to the page-mode message having been received.

4. A method of claim 1, wherein the adding comprises adding the indication in an m-line in the header.

5. A method of claim 1, wherein the adding comprises adding the indication comprising a parameter indicating an actual size of the page-mode message.

6. A method of claim 1, wherein the adding comprises adding the indication comprising an m-line indication and a parameter indicating an actual size of the page-mode message.

7. An apparatus, comprising:
   at least one processor; and
   memory including computer program code,
   the memory and the computer program code configured to, with the at least one processor, cause the apparatus at least to
      send a message using a session-mode messaging mechanism, with an indication indicating that the message is a page-mode message, in response to a page-mode message size exceeding a predetermined limit,
      apply, using the terminal, a session description protocol to initiate a session in the session-mode messaging mechanism, and
      add, using the terminal, the indication to a header of a session initiation message.

8. An apparatus of claim 7, wherein the memory and the computer program code are further configured to, with the at least one processor, cause the apparatus at least to send the page-mode message in response to a user command.

9. An apparatus, comprising:
   at least one processor; and
   memory including computer program code,
   the memory and the computer program code configured to, with the at least one processor, cause the apparatus at least to
      detect an indication in a header of a session initiation message that a session-mode messaging mechanism is used for a page-mode message, and
      in response to the indication, treat a received session-mode message as the page-mode message,
      wherein the page-mode message is received in response to a page-mode message size exceeding a predetermined limit.

10. An apparatus of claim 9, wherein the memory and the computer program code are further configured to, with the at least one processor, cause the apparatus at least to store the received page-mode message in response to the reception.

11. An apparatus of claim 9, wherein the memory and the computer program code are further configured to, with the at least one processor, cause the apparatus at least to notify a user of the page-mode message.

12. An apparatus of claim 9, wherein the memory and the computer program code are further configured to, with the at least one processor, cause the apparatus at least to check, in response to said indication, a size of the page-mode message, and to decide continuation or termination of the session-mode mechanism based on the size of the page-mode message.

13. An apparatus of claim 9, wherein the memory and the computer program code are further configured to, with the at least one processor, cause the apparatus at least to check, in response to said indication, a size of the page-mode message, to request from a user further instructions relating to continuation or termination of the session-mode mechanism, and to show the size of the page-mode message to the user.

14. An apparatus of claim 9, wherein the memory and the computer program code are further configured to, with the at least one processor, cause the apparatus at least to continue the session-mode mechanism by forwarding a session request relating to said page-mode message.

15. A server apparatus, comprising:

at least one processor; and memory including computer program code, the memory and the computer program code configured to, with the at least one processor, cause the server apparatus at least to detect an indication in a header of a session initiation message that a session-mode messaging mechanism is used for a page-mode message, in response to the indication, assume itself to be an end-point of the session-mode messaging mechanism, and in response to the indication, define a message received via the session-mode messaging mechanism as the page-mode message, wherein the page-mode message is received in response to a page-mode message size exceeding a predetermined limit.

16. A method comprising:

receiving, using a transceiver, a session-mode message with an indication in the header of the session-mode message indicating that a session-mode is for a page-mode message; and in response to said indication, treating, using a user terminal, the received session-mode message as the page-mode message, wherein the page-mode message is received in response to a page-mode message size exceeding a predetermined limit.

17. A non-transitory computer readable storage medium embodying program instructions, wherein execution of said computer program instructions causes a device to:

send a page-mode message using a session-mode messaging mechanism, with an indication indicating that a session-mode is for the page-mode message, in response to a page-mode message size exceeding a predetermined limit, apply, using the terminal, a session description protocol to initiate a session in the session-mode messaging mechanism, and add, using the terminal, the indication to a header of a session initiation message.

18. A non-transitory computer readable storage medium embodying program instructions, wherein execution of said computer program instructions causes a device to:

treat, in response to a session-mode message being received with an indication in a header of the session-mode message indicating that the session-mode is for a page-mode message, the received session-mode message as the page-mode message, wherein the page-mode message is received in response to a page-mode message size exceeding a predetermined limit.

19. An apparatus of claim 7, wherein the apparatus is a user terminal and the memory and the computer program code are further configured to, with the at least one processor, cause the user terminal to use a session description protocol to initiate a session in the session-mode messaging mechanism; and to add the indication to an m-line in a header of a session initiation message.

* * * * *